(12) United States Patent
Vitale, Jr. et al.

(10) Patent No.: US 6,294,389 B1
(45) Date of Patent: Sep. 25, 2001

(54) FURNACE FOR AN ENGINE EXHAUST MEASUREMENT SYSTEM

(75) Inventors: Joseph Anthony Vitale, Jr., Shelby Township; Richard William Gushman, Rochester Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/431,374

(22) Filed: Nov. 1, 1999

(51) Int. Cl.$^7$ .......................... G01M 15/00; G01M 27/26
(52) U.S. Cl. .................. 436/57; 73/23.31; 73/23.37; 436/56
(58) Field of Search .................. 250/343; 204/153; 73/116, 23.31, 23.37; 60/275, 302; 502/64; 422/171; 436/56, 57

(56) References Cited

U.S. PATENT DOCUMENTS

| | | | |
|---|---|---|---|
| Re. 36,171 | * | 3/1999 | Balling et al. . |
| 4,990,780 | * | 2/1991 | Lee et al. . |
| 5,129,257 | * | 7/1992 | Carduner et al. . |
| 5,211,820 | * | 5/1993 | Poor et al. . |
| 5,445,964 | | 8/1995 | Lee et al. ................. 436/60 |
| 5,928,981 | * | 7/1999 | Leyrer et al. . |
| 5,937,641 | * | 8/1999 | Graham et al. . |
| 5,953,908 | * | 9/1999 | Appleby . |

* cited by examiner

*Primary Examiner*—Jill Warden
*Assistant Examiner*—Brian Sines
(74) *Attorney, Agent, or Firm*—Lawrence B. Plant

(57) ABSTRACT

An apparatus and method by which tracer compounds and combustion products in the exhaust of an internal combustion engine are more completely combusted, so that oil consumption of the engine can be more precisely and concurrently measured on a real-time basis using tunable diode laser spectroscopy. The apparatus includes a furnace capable of completely burning nonradioactive stable organobromo compounds and combustion products within the exhaust gas of the engine, without being reactive with the compounds or the resulting tracer gas or isotopic specie of the compounds. The furnace generally has at least one passage through which the exhaust gas passes. The wall surfaces of the passage are formed of a material with a high concentration of titanium, such that the exhaust gas is substantially limited to contact with the high-Ti material while within the furnace. Turbulent flow is preferably induced in the exhaust gas within the passage, while the gas is heated to a temperature sufficient to combust the compound and yield the desired tracer isotopic specie.

8 Claims, 2 Drawing Sheets

FURNACE FOR AN ENGINE EXHAUST MEASUREMENT SYSTEM

TECHNICAL FIELD

This invention generally relates to methods for determining engine oil consumption in internal combustion engines. More particularly, this invention relates to an apparatus and method that employ a furnace for complete combustion of a tracer compound to promote the measurement of oil consumption using laser spectroscopy of a tracer isotopic specie produced by combustion of the tracer compound.

BACKGROUND OF THE INVENTION

For evaluating the performance of an internal combustion engine and the corresponding engine design development, it is desirable to provide dynamic measurements of engine oil consumption during operation of the internal combustion engine. Early methods for determining oil consumption included the use of a dipstick, drain-weigh techniques, sulfur methods and radiometric techniques. However, each of these methods have serious shortcomings, and all fail to provide real-time analysis of oil consumption. Radiometric methods originally employed in the art provided a very precise method for measuring oil consumption through the addition of a radioactive bromine tracer 1,2-dibromooctadecane to the engine oil. With this method, the resultant combustion product from the internal combustion engine is trapped within a sodium hydroxide solution and counted by scintillation counting. Though extremely accurate, this method is undesirable because of the significant radioactive health and safety considerations and regulatory requirements necessary for its use. Another shortcoming is that radiometric methods are essentially batch processes which do not readily lend themselves to individual measurements, and require the preparation of a fresh radioactive bromine tracer for each batch operation because of the short half life of the tracer.

As a solution to the above, U.S. Pat. Nos. 4,990,780 and 5,445,964 to Lee et al., assigned to the assignee of this invention and incorporated herein by reference, provide a method for determining oil and fuel consumption that is relatively simple and precise, enables real-time measurements. Each of these patents teaches the use of nonradioactive tracer compounds, such as bromine in the form of organic bromo-compounds, which are added in small amounts to the engine oil. When combusted in the presence of hydrocarbon compounds in oil and fuel, the bromine constituent of the particular compound is converted into hydrogen bromide (HBr). A sample of the exhaust gases generated by the internal combustion engine and containing HBr is then analyzed within a sample cell, where the gas sample is maintained at a pressure at which a distinction between an absorption line of the tracer specie and the absorption lines of a related isotopic species can be discerned. Monochromatic radiation is then transmitted through the gas sample at the frequency of an absorption line for the tracer specie. Tunable diode laser spectroscopy is preferably used with collimating and collecting optics that are preferably reflective, off-axis parabolic or focusing mirrors. The sample cell is a long-path multi-pass all-reflection absorption cell or a waveguide sample cell to achieve the high sensitivity required for analysis of the extremely minute gas component.

In use, the engine exhaust measurement systems taught by Lee et al. have performed extremely well. However, under some engine operating conditions, the tracer compound has been found to incompletely combust, with the result that HBr is not completely formed and the spectrometer is unable to detect the entire specie in the engine exhaust. Also under some operating conditions, partially burnt products of combustion from the engine exhaust have been found to adhere to the mirrors of the sample cell and render them unusable after a short period of time.

Therefore, it would be desirable if improvements in the teachings of Lee et al. could be achieved by which the exhaust gas of an engine was fully combusted to ensure that gaseous HBr is present and detectable, without undesirably altering the gas sample or the performance of the engine exhaust measurement system.

SUMMARY OF THE INVENTION

The present invention provides an apparatus and method by which tracer compounds and combustion products in the exhaust gas of an internal combustion engine are more completely combusted, so that oil consumption of the engine can be precisely and concurrently measured on a real-time basis using tunable diode laser spectroscopy. The apparatus includes what is effectively a furnace capable of more completely burning nonradioactive stable oganobromo compounds and combustion products within the exhaust gas of the engine, without being reactive with the tracer compounds or the resulting tracer gas or isotopic specie.

The apparatus and method of this invention provide an improvement over the teachings of U.S. Pat. Nos. 4,990,780 and 5,445,964 to Lee et al., in which nonradioactive organobromo compounds are added to the engine oil in small amounts in order to yield hydrogen bromide (HBr) as a tracer isotopic specie upon combustion. Exhaust gas passes from the engine into the furnace, where uncombusted tracer, fuel and oil are completely burned as a result of contacting heated internal surfaces that define internal passages within the furnace. According to the invention, the internal surfaces are formed of commercially-pure titanium, such that the exhaust gas is substantially limited to contact with commercially-pure titanium while within the furnace. Also according to the invention, turbulent flow is induced in the exhaust gas within the internal passages of the furnace, and the gas within the passages is heated to a temperature sufficient to combust the compound and yield the desired tracer isotopic specie. Thereafter, a sample of the exhaust gas containing the HBr continuously flows through a sample cell, and is maintained at a pressure within the sample cell where distinction between an absorption line of the tracer specie and the absorption lines of a related isotopic species is discernible. Monochromatic radiation is then transmitted through the gaseous sample at the frequency of an absorption line for the tracer specie. Because of the high spectral power density and spectral resolution of the preferred tunable diode lasers, tunable diode laser spectroscopy is preferably used to measure the trace amount of the resultant HBr in the exhaust gases.

According to the above, the inclusion of the furnace in an exhaust measurement system employing tunable diode laser spectroscopy has been shown to completely combust organobromo compounds within the exhaust gas of an internal combustion engine, as well as any residual fuel or oil combustion products of the engine. The surfaces of the furnace that contact the exhaust gas are required to be formed of material with a high concentration of titanium in order to avoid detrimental chemical reactions with the tracer compounds. Consequently, the furnace is free of any catalysts of the type conventionally used to promote the complete combustion of engine exhaust products. The passages within the furnace preferably include suitable features for increasing the gas contact surface area and turbulent flow of the gas through the furnace in order to render the furnace more efficient.

Other objects and advantages of this invention will be better appreciated from a detailed description thereof which follows.

DESCRIPTION OF THE PREFERRED EMBODIMENT

The present invention provides an improvement over the exhaust gas measurement systems of U.S. Pat. Nos. 4,990,780 and 5,445,964 to Lee et al., by the inclusion of a furnace 34 shown in FIGS. 3 and 4. The furnace 34 is configured to ensure that a nonradioactive stable organobromo compound added to the oil of an internal combustion engine is completely combusted, in order to maximize the amount of hydrogen bromide (HBr) present in the exhaust gas. The furnace 34 also ensures that combustion products that might otherwise interfere with the detection of HBr in the exhaust gas are completely combusted. A more detailed description of the furnace 34 is provided after the following discussion of the operation of the exhaust gas measurement system in which the furnace 34 is used.

In accordance with this invention and the teachings of U.S. Pat. Nos. 4,990,780 and 5,445,964 to Lee et al., nonradioactive stable organobromo compounds are added to the oil of an internal combustion engine for the purpose of forming a tracer gas of HBr, an isotopic specie of which is then detected and measured with a tunable diode laser spectrometer to determine the oil consumption of the engine. Generally, the organobromo compound is matched to the volatility of the oil, and then added in small amounts in its natural isotopic abundance or in an enriched state. A suitable compound for use with this invention is 1,2 dibromo-octodecane.

For bromine tracers, there are two naturally occurring isotopes, $^{79}Br$ and $^{81}Br$, with relative abundances of approximately 50.5 percent and approximately 49.5 percent, respectively. The strong infrared transitions of HBr are in the frequency range of about 2400 to about 2700 $cm^{-1}$, with about 10 $cm^{-1}$ to about 16 $cm^{-1}$ separation between successive vibration rotation lines and with about 0.3 $cm^{-1}$ to about 0.4 $cm^{-1}$ separation between the isotopic $H^{79}Br$ and $H^{81}Br$ transition. In the same spectral region, there are weak carbon dioxide vibration-rotation lines. The concentration of $CO_2$ in the exhaust gases is typically about ten percent, which is roughly $10^6$ times higher than the concentration of HBr in the exhaust gases. Using conventional techniques, the measurement of a low concentration species may be complicated by the presence of a high concentration species. However, this difficulty is diminished due to the inverse difference in line intensities of the various gases. There are several spectral regions with adequate line spacings between the gases and with comparable line intensity values for ease of measurement. In addition, there are some spectral regions where it is feasible to measure both isotopic forms of HBr so as to provide a built-in check on the precision of this preferred laser spectrometer oil consumption measurement.

Figure 1:
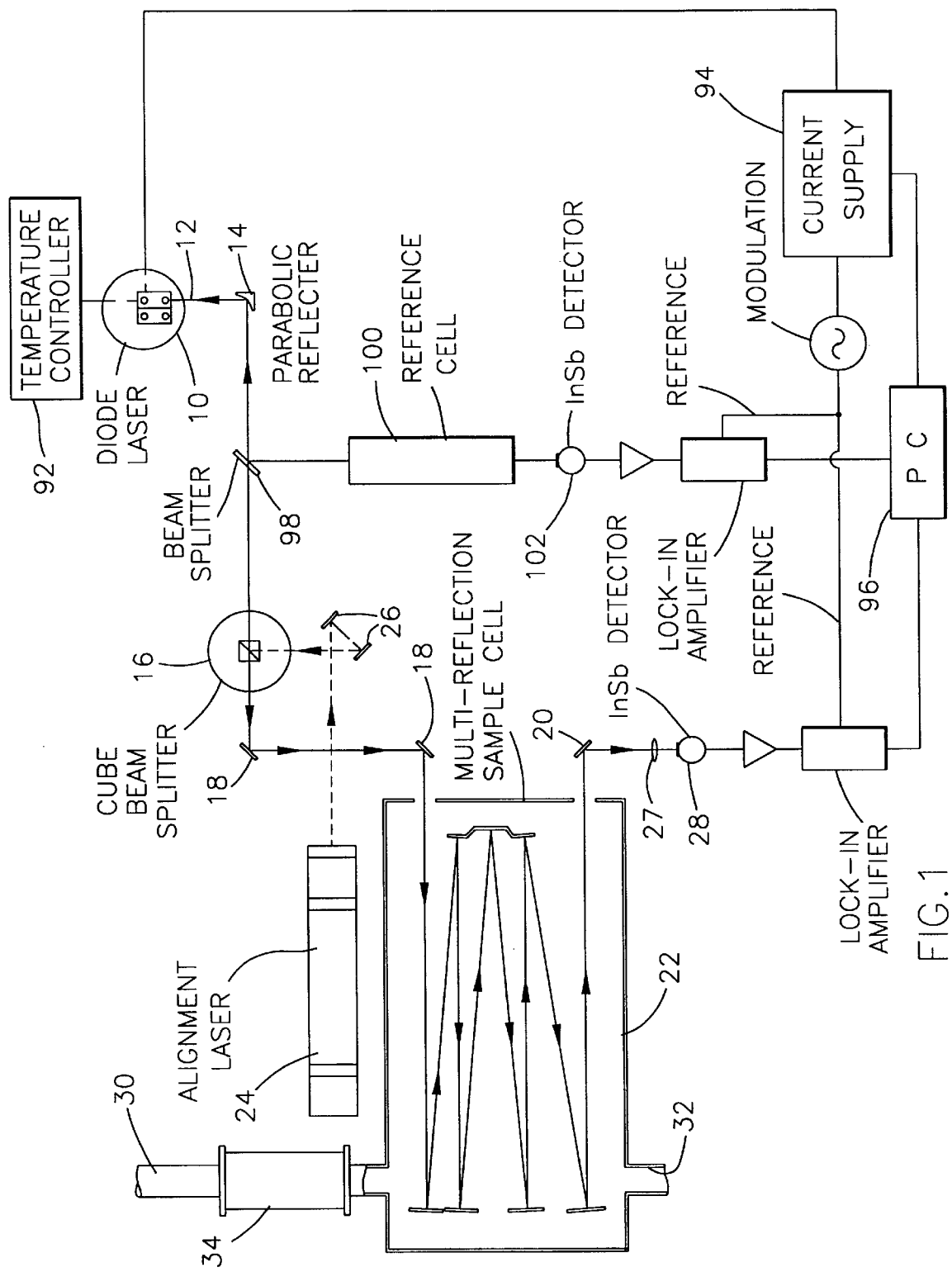
FIG. 1 is a schematic of a tunable diode laser spectrometer system employing an exhaust furnace in accordance with a preferred embodiment of this invention.

Similar to U.S. Pat. Nos. 4,990,780 and 5,445,964 to Lee et al., the present invention employs tunable diode laser absorption spectroscopy to measure HBr in the exhaust gas of an internal combustion engine. An example of such a spectroscopic system is represented in FIG. 1. As with the systems taught by the patents to Lee et al., the spectroscopic system of FIG. 1 is characterized by the following features. First, all of the collimating and collecting optics used are preferably reflective, off-axis parabolic or focusing mirrors. This is desirable since reflective optics minimize optical interferences. Second, it is preferred to use dual beam optics for the purpose of fine tuning the laser frequency. Third, a long path multi-pass all reflection absorption cell of a White or Herriott design (as will be further discussed below) is preferably utilized to achieve the high sensitivity required for this extremely minute gas component analysis. Lastly, where windows are needed in the system, either for the tunable diode laser or the detectors or the absorption cell, tilted window holders or wedged windows are preferred so that the unwanted reflections are steered out of the optical system.

As shown in FIG. 1, the spectroscopic system includes a tunable diode laser 10 which emits an infrared laser emission 12 of preferably high spectral power density and a spectral resolution better than approximately 0.0001 of a wave number. The laser 10 is preferably of the IV-VI compounds such as a lead chalcogenide diode laser of a buried MBE design and composed of PbEuSeTe (1.5% Eu doped), available from Laser Photonics of Andover, Mass., but may also be of the lead salt type described in U.S. Pat. Nos. 4,350,990 and 4,186,355 to Lo and U.S. Pat. No. 4,577,322 and 4,608,694 to Partin, or of the III-V compounds such as the GaAs types. Such lasers are coarsely tuned by varying the operating temperature and fine tuned by varying the injection current. These lasers are available for operation in the wavelength range of 2.5 to 30 microns for the lead-salt type lasers. The laser 10 may be scanned over a small band, about 0.5 to 3 $cm^{-1}$ at a ramping rate of about 500 cycles per second. The laser 10 may also be tuned to emit at a preset wavelength without scanning action to specifically target an absorption peak, for example. Alternatively, scanning or sweeping action allows the entire absorption curve related to a single line to be measured in detail. By varying the heat sink temperature and the injection current of a laser emitting at an appropriate frequency range, the laser system can be fine tuned for a variety of isotopes and molecules. Many infrared active-molecule with a suitable spectrum can be studied by this system. The system therefore would be versatile rather than dedicated to a single isotopic species. The isotopic spectral lines are well resolved, thus eliminating any background interference like that encountered in more conventional techniques.

The GaAs types of lasers mentioned above are in a class of shorter wavelength diode lasers composed of III-V compounds involving some of the following elements: Al, Ga, In, P, As and Sb. These lasers may not emit at the fundamental vibration-rotation frequencies but are utilized for combination or overtone bands along with the more sensitive detecting schemes for stable isotope analysis. These shorter wavelength lasers operate at relatively high heat sink temperatures and with shorter wavelength infrared detectors, thereby facilitating the use of inexpensive coolers such as thermoelectric coolers, or alternatively, require no cooling below room temperature.

As shown in FIG. 1, the laser emission 12 is collimated with an off-axis parabolic mirror 14, and reflected by a transfer optics system composed of planar mirrors 18 through a multi-reflection sample cell 22. A suitable sample cell 22 for this invention is a "White cell" available from Infrared Analysis of Anaheim, Calif., or a "Herriott" design from Aerodyne Research, Inc., of Billerica, Mass. Alternatively, the sample cell represented in FIG. 4 of U.S. Pat. No. 5,445,964 to Lee et al. could be employed. The laser emission 12 is preferably multi-reflected in the sample cell 22 to provide extended path lengths. Generally, longer optical path lengths enhance the exhaust signal for HBr, but also decrease the overall intensity of the signal due to more reflection loss. Accordingly, a proper balance between the gain in signal due to absorption and the loss in signal due to reflection must be achieved. Upon leaving the sample cell 22, the laser emission 12 is reflected by a planar mirror 20 through a long focal length lens 27 to a detector 28, such as an InSb detector. The sample cell 22 is provided with exhaust gas from an internal combustion engine (not shown), as will be discussed in greater detail below. The laser 10 is tuned so that this mode spans the absorption line of the desired tracer molecule.

In FIG. 1, dual beam optics are employed in which the diode laser emission is split by a beam splitter 98 through a reference cell 100 containing a standard sample of the compound to be measured in the sample cell 22. A first derivative signal from this reference cell 100 is generated by a second InSb detector 102 and is used to lock the laser frequency through a feedback control of the laser's current supply 94, which finely tunes the laser frequency. The first derivative at the line center is zero, and any drift from center will produce a positive or negative error signal which is fed back to the current supply 94.

To facilitate the alignment of the invisible infrared radiation laser emission 12, a HeNe laser 24, a cube beam splitter 16 and a pair of plane reflecting mirrors 26 may be used to properly align the laser 10, the sample cell 22 and the detector 28. During the initial setup, a grating monochromator may be used to provide wavelength identification and to filter out unwanted laser modes. Once the proper conditions for wavelength interval and single mode operation are established, the monochromator can be bypassed. The detector 28 senses the radiation which passes through the sample cell 22, and relays an appropriate signal to a signal processor, such as the personal computer (PC) shown, which processes the detector signals and provides an output on a display (not shown). The signal processor may be equipped to analyze the signal in accordance with second harmonic detection techniques.

Figure 2:
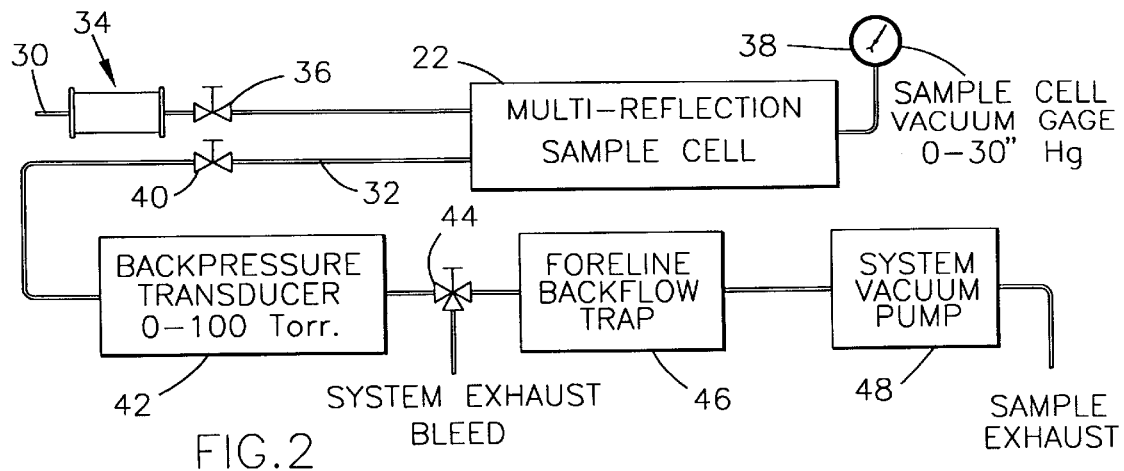
FIG. 2 is a schematic of a system plumbing diagram for use with the tunable diode laser spectrometer system of FIG. 1.

As schematically represented in FIG. 2, the exhaust gas plumbing system employed by this invention includes an exhaust line 30 between the test engine (not shown) and the furnace 34, and a valve 36 between the furnace 34 and the sample cell 22 in order to meter the appropriate amount of exhaust gas from the engine. The valve 36 is preferably a one inch (about 25 mm) commercially-pure titanium ball valve. A vacuum gage 38 may be used to monitor the system vacuum, and a ball valve 40 is preferably provided downstream of the sample cell 22 in order to facilitate system leak checks using the vacuum gage 38. A pressure transducer 42, such as an MKS Baratron 0 to 100 torr transducer available from MKS Industries, is located further downstream from the sample cell 22 for the purpose of measuring the system pressure. A ⅜ inch gate valve 44 is installed further downstream to allow relieving the system vacuum, and a foreline trap 46 is preferably located between the gate valve 44 and the system vacuum pump 48 in order to eliminate back-flow contamination from the pump 48, which would otherwise possibly result in fogging of the sample cell mirrors.

According to this invention, measurements are preferably made on a single absorption line in the spectra of the tracer isotopic specie. Such an absorption line is selected from a region free from interference or, alternatively, appropriately spaced from the other isotopic species. Though the exhaust sample essentially does not require any special preparation, it is essential that the organobromo compound added to the oil is completely combusted in the presence of hydrocarbon compounds in the fuel and oil to yield an adequate level of HBr. Complete combustion of any partially burnt products of combustion in the exhaust gas is also important to prevent their deposition on the mirrors or waveguides of the sample cell 22. According to this invention, complete combustion of the exhaust gas is ensured by the furnace 34 schematically represented in FIGS. 1 and 2, a preferred embodiment of which is shown in greater detail in FIGS. 3 and 4.

Figure 3:
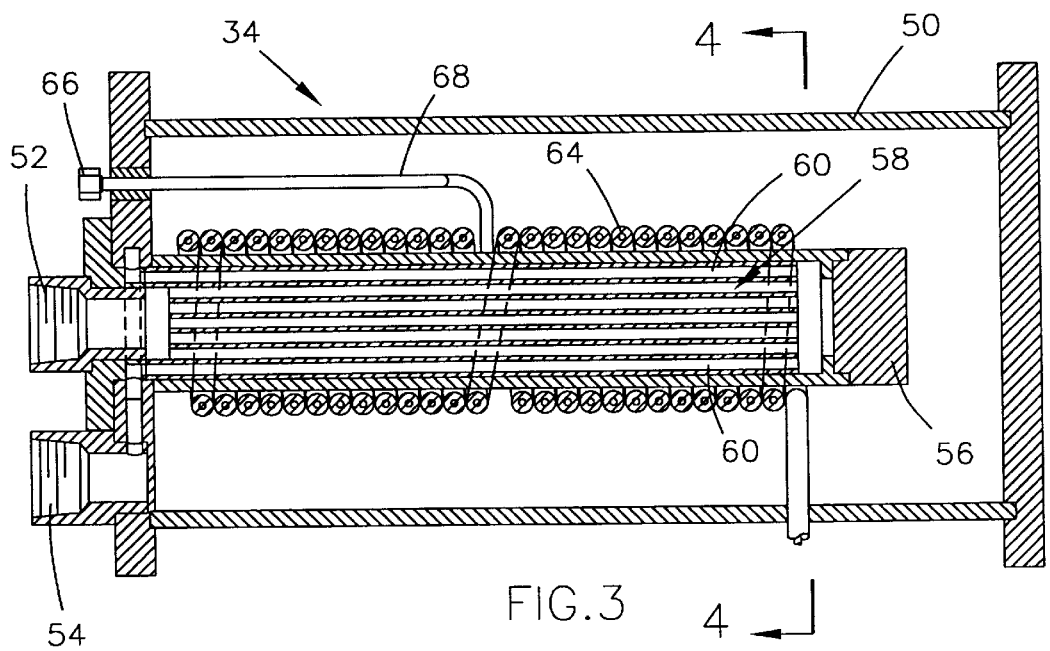
FIGS. 3 and 4 are vertical and horizontal cross-sections, respectively, of the exhaust furnace of FIG. 1.

As seen from FIG. 3, the furnace 34 generally includes a protective outer enclosure 50 with inlet and outlet ports 52 and 54. The inlet port 52 is coupled to the test engine (not shown) via the exhaust line 30, while the outlet port 54 is closely coupled to the sample cell 22. Within the outer enclosure 50 is a combustion chamber 56 having an inlet passage 58 in fluidic communication with the inlet port 52 and one or more outlet passages 60 in fluidic communication with the outlet port 54. The inlet passage 58 is preferably centrally located within the combustion chamber 56, while the outlet passages 60 are disposed at the perimeter of the enclosure 56. Surrounding the combustion chamber 56 is a heating element 64 for the purpose of heating the exhaust gas within the inlet and outlet passages 58 and 60 to a temperature sufficient to completely combust any residuals of the nonradioactive organobromo tracer compound and any incompletely burned combustion products remaining in the exhaust gas. In practice, a suitable combustion temperature is in the range of about 550° C. to about 650° C., with a preferred temperature range being about 600° C. to about 625° C. Various heating elements known in the art could be used, with an electrically resistive heating element being preferred in direct contact with the exterior of the combustion chamber 56. Also shown in FIG. 3 is an inlet 66 and pipe 68 through which air or oxygen can be introduced into the inlet passage 58 for the purpose of promoting the complete combustion of the remaining tracer compound, fuel and oil in the exhaust gas at the combustion temperature. Oxygen flow is preferably regulated at about 0.6 SCFH (about 0.017 m$^3$/hr). The outlet passages 60 is shown as being between the inlet passage 58 and the heating element 64, so that the oxygen and exhaust mixture within the inlet passage 58 are preheated prior to combustion. Also, due to the high flow rates of the exhaust sample, any other location for the outlet passages 60 could potentially result in a severe decrease in the operating temperature of the furnace system.

Figure 4:
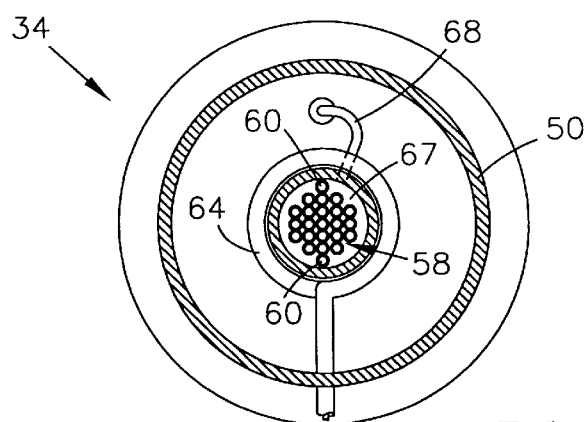

As seen from FIG. 4, the inlet passage 58 generally contains a honeycomb structure 62 that defines a plurality of individual passages, whose combined cross-sectional flow area is larger than that of the outlet passages 60. The honeycomb structure 62 promotes heat transfer to the exhaust gas by increasing the surface area of the inlet passage 58 and inducing turbulent flow in the exhaust gas within the inlet passage 58.

According to a critical aspect of this invention, the walls of the inlet and outlet passages 58 and 60 and the honeycomb structure 62 are formed exclusively from material with a high concentration of titanium, such that the exhaust gas passing through the furnace 34 is limited to contact with a high-Ti material while at the combustion temperature within the furnace 34. According to the invention, the use of conventional catalytic furnaces and materials to combust the tracer compound, fuel and oil in the exhaust gas were found to be unacceptable due to chemical reactions between the tracer compound, the catalyst material and materials conventionally used to form such furnaces, such as stainless steels and HASTELLOY® alloys. Significantly inaccurate test results were obtained as a result of these reactions. A review of candidate catalytic materials did not reveal any catalysts that would be chemically compatible with the organobromo tracer compounds or the resulting tracer gases of this invention. Commercially-pure (i.e., at least 99% titanium by mass) titanium was found to be chemically unreactive with the tracer compound and its tracer species and, when used to form the inlet and outlet passages 58 and 60 and the honeycomb structure 62 (when appropriately heated) of the furnace 34 shown in FIGS. 3 and 4, was shown to result in the complete combustion of the tracer compound, fuel and oil contained in an exhaust gas sample that was continuously obtained from a test engine.

It is believed that the concentration of titanium is roughly proportional to the effectiveness of the furnace 34 in completely combusting the tracer compound, fuel and oil contained in an exhaust gas sample. Based on the results obtained with commercially-pure titanium, suitable results should be achievable using materials with titanium concentrations as low as about 90% by weight. However, titanium concentrations of much less than 90%, as is the case with typical TiAl alloys, would not achieve adequate results for purposes of this invention. Accordingly, the phrase "A high concentration of titanium=" as used herein is define to indicate materials whose titanium concentrations are at least 90% by weight.

In operation, measurements of exhaust gas compositions with the spectroscopic system of this invention will be from engine or stationary vehicle tests, such as those conducted on a chassis dynamometer. After the engine oil of the engine is treated with the chosen tracer compound either in its natural isotopic abundance or enriched, the engine is run to produce a continuous flow of undiluted exhaust gas that is drawn from the exhaust manifold of the test engine (not shown) through the exhaust line 30 into the furnace 34. Within the furnace 34, the exhaust gas sample flows through the inlet passage 58 where turbulent flow is induced and the exhaust gas sufficiently heated to combust the tracer compound and yield a tracer gas and isotopic specie. Afterwards, the exhaust gas is flowed to the sample cell 22, where it is maintained at the desired pressure by the vacuum pump 48. The volume of the sample cell 22 will depend on the isotopic form of HBr used as the tracer. However, after the operating conditions are determined, the volume of the sample cell 22 is minimized to promote rapid throughput of the gas for the best time resolution of the signal. The actual time resolution is measured by determining instrument response to a bolus of test gas introduced at the exhaust inlet 30 and the system dimensions adjusted to maximize performance.

As the exhaust gas flows through the sample cell 22, monochromatic radiation is transmitted from the tunable diode laser 10 (maintained at a set temperature by a temperature controller 92 and electrically connected to a current control module 94) through the exhaust gas sample in the cell 22 at the frequency of an absorption line of the isotopic tracer specie of interest. The detector 28 analyzes the resulting spectroscopic signals, including the intensity (I) of the radiation, and furnishes the measurements to a computer 96 for further analysis. The exhaust gas sample continues to flow through the sample cell 22 via an exhaust outlet 32, from which the sample eventually flows out of the plumbing system.

To determine the absolute concentration value of the tracer specie, a measure of the incident radiation intensity, $I_0$, is needed. That value is obtained by evacuating the sample cell 22 and measuring the intensity of the transmitted radiation at the same frequency after passing through the evacuated sample cell 22. An alternative method for obtaining the incident radiation intensity, $I_0$, is by turning the frequency of the radiation to a value, $f_0$, just off the absorption line, that is, near the absorption line but not subject to absorption by that line. The concentration of the tracer specie is determined from the Beer-Lambert law: $I=I_0 e^{-\alpha p l}$, where "$\alpha$" is the spectral absorption coefficient of the tracer molecule, "p" is the pressure of the tracer molecule in torr, and "l" is the path length (in centimeters). This spectroscopic measurement technique is useful for a large tracer specie concentration. It is also useful for a small tracer specie concentration if cumulative concentration signals from repeated cumulative spectral scans are used.

For low tracer specie concentration, it is preferable to use a wavelength modulation and harmonic detection technique which provides a superior signal-to-noise ratio compared to a conventional straight absorption measurement. As the diode laser 10 is tuned over the spectral feature of interest, the wavelength of measurement is modulated at high frequency, such as about one to about twelve kilohertz, and with a window on the order of the spectral linewidth. The output of the detector 28 is processed by a frequency and phase selective amplification system (such as a lock-in amplifier) which is referenced to the modulation frequency. When the detection system is tuned to the second harmonic of the modulation frequency, the output is proportional to the second derivative of the spectral signal. The wavelength modulation is, in effect, averaging the spectral signal a number of times over a small window for each data point. It is important to note that the method is insensitive to any DC component of the signal such as the broad luminescence background emission that may be present in the laser 10. The spectral peak is related to the concentration of the measured specie by a working curve obtained by calibration of the spectrometer using calibration samples of known concentration, such as a permeation device. This technique is exceptionally good for measurement of very low concentrations, but a simpler and more direct technique, as described above, may be used where larger concentrations are to be measured.

To reduce signal noise during operation, various techniques may be necessary, depending on the type and source of the noise. Electrical noise arising from an AC source and picked up by the detector 28 as a radiant signal may be minimized or eliminated by proper shielding and grounding. Optical noise arising from interference fringes may be minimized or eliminated by utilizing wedged windows in the sample cell 22, and by placing a filter, such as a silicon wafer used in microelectronic fabrication, and an aperture in front of the detector 28. Finally, mechanical noise arising from the rattling of the reflective mirrors within the sample cell 22 may be minimized or eliminated by modifying the mounting fixtures in the sample cell 22.

To further enhance the operation of the spectroscopic system when using bromine as the tracer compound, a chloro-compound such as ethylene dichloride is added to the fuel in amounts of about 20 milliliters per gallon in order to ensure transport of HBr to the sample cell 22. Upon combustion, the resulting HCl will be present in greater quantities than the HBr from the oil, and will saturate available active sites in the engine with which the HBr would otherwise react, resulting in the HBr being absorbed instead of being transported to the sample cell 22.

In accordance with the teachings of U.S. Pat. Nos. 4,990,780 and 5,445,964 to Lee et al., it is anticipated that the measurement system of this invention is able to monitor oil consumption during conventional multi-mode emission tests and other dynamometer tests of engines or whole vehicles. Measurements of this type taken over very short periods of time, i.e., seconds or minutes, allow comparisons to be made of the effects of component-design modifications on oil consumption over a wide range of engine operating conditions. This type of testing is not possible with drain-weigh or dipstick techniques due to the inaccuracy and long run time necessary to make such measurements. In addition, this system permits the use of a nonradioactive tracer compound in the oil.

While our invention has been described in terms of a preferred embodiment, it is apparent that other forms could be adopted by one skilled in the art. Furthermore, different laser materials, cooling techniques and plumbing schemes could be used, the sample cell could be modified to employ fiber optics, and the furnace 34 could be configured differently from that shown in the Figures. Accordingly, the scope of our invention is to be limited only by the following claims.

What is claimed is:

1. A method for evaluating engine oil consumption on a near real-time basis in an internal combustion engine, the method comprising the steps of:

treating the engine oil with a nonradioactive compound either in its natural isotopic abundance or enriched, the nonradioactive compound being combustible so that the exhaust gas of the internal combustion engine contains a tracer gas comprising a tracer isotopic specie;

continuously flowing an exhaust gas sample from the internal combustion engine into a furnace comprising at least one passage through which the exhaust gas flows within the furnace, the at least one passage being defined by at least one wall surface in contact with the exhaust gas, the at least one passage is free of any catalytic material the wall surface being formed of a material with a high concentration of titanium such that the exhaust gas is substantially limited to contact with the material while within the furnace;

inducing turbulent flow of the exhaust gas within the at least one passage;

heating the exhaust gas within the at least one passage to a temperature sufficient to combust the tracer compound in the exhaust gas;

flowing the exhaust gas sample to a sample cell downstream of the furnace; and then transmitting monochromatic radiation through the exhaust gas sample in the sample cell at the frequency of an absorption line for the tracer isotopic specie, while concurrently detecting the intensity of a spectral line for the tracer isotopic specie so as to determine engine oil consumption in the internal combustion engine on a near real-time basis.

2. The method recited in claim 1, wherein turbulence is induced in the exhaust gas by a honeycomb structure that defines multiple passages within the at least one passage, the honeycomb structure being formed of a material with a high concentration of titanium.

3. The method recited in claim 1, wherein the wall surface is formed of a material with a titanium concentration of at least 99% by weight.

4. The method recited in claim 1, wherein the nonradioactive tracer compound is an organobromo compound.

5. The method recited in claim 1, wherein the tracer gas is hydrogen bromide.

6. The method recited in claim 1, further comprising the step of introducing air into the furnace.

7. The method recited in claim 1, wherein the transmitting step comprises guiding the monochromatic radiation through the sample cell with mirrors.

8. A method for evaluating engine oil consumption on a near real-time basis in an internal combustion engine, the method comprising the steps of:

treating the engine oil with a nonradioactive compound either in its natural isotopic abundance or enriched, the nonradioactive compound being combustible so that the exhaust gas of the internal combustion engine contains a tracer gas comprising a tracer isotopic specie;

flowing an exhaust gas sample from the internal combustion engine into a furnace such that the exhaust gas sample does not contact a catalytic material while the exhaust gas sample flows through the furnace, and such that while within the furnace the exhaust gas is substantially limited to contact with a material having a high concentration of titanium;

heating the exhaust gas within the furnace to a temperature sufficient to combust the tracer compound in the exhaust gas;

flowing the exhaust gas sample to a sample cell downstream of the furnace; and then transmitting monochromatic radiation through the exhaust gas sample in the sample cell at the frequency of an absorption line for the tracer isotopic specie, while concurrently detecting the intensity of a spectral line for the tracer isotopic specie so as to determine engine oil consumption in the internal combustion engine on a near real-time basis.

\* \* \* \* \*